US006207215B1

(12) United States Patent
Wilson et al.

(10) Patent No.: US 6,207,215 B1
(45) Date of Patent: *Mar. 27, 2001

(54) HIGH TEMPERATURE/ULTRA HIGH PRESSURE STERILIZATION OF FOODS

(75) Inventors: Michael J. Wilson, Rossmoor, CA (US); Robert Baker, Delaware, OH (US)

(73) Assignee: Kal Kan Foods, Inc., Vernon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/578,126

(22) Filed: May 24, 2000

Related U.S. Application Data

(63) Continuation of application No. 08/572,656, filed on Dec. 14, 1995, now Pat. No. 6,086,936.

(51) Int. Cl.$^7$ .......................................................... A23L 3/16
(52) U.S. Cl. .......................................... 426/521; 426/524
(58) Field of Search ............................ 426/330.2, 330.5, 426/407, 390, 521, 524, 580, 599

(56) References Cited

U.S. PATENT DOCUMENTS

| 5,213,029 | 5/1993 | Yukata ............................... 99/467 X |
| 5,217,687 | 6/1993 | Sewell .................................... 422/21 |
| 5,316,745 | 5/1994 | Ting et al. ......................... 99/461 X |
| 5,494,691 | 2/1996 | Sizer ................................. 426/521 X |
| 6,086,936 | * 7/2000 | Wilson et al. ....................... 426/521 |

FOREIGN PATENT DOCUMENTS

| 4250772 | 2/1994 | (AU) . |
| 2257864 | 10/1990 | (JP) . |
| 3183450 | 8/1991 | (JP) . |
| 9511600 | 5/1995 | (WO) . |

OTHER PUBLICATIONS

Cliver, Dean O., Ed., *Foodborne Diseases*, pp. 116–120.
Banwart, George J., *Basic Food Microbiology*, 2$^{nd}$ ed., pp. 219–239.
Block, Seymour S., *Disinfection, Sterilization, and Preservation*, 4$^{th}$ ed., pp. 85–124.
Ifuku et al., New Development on the Japanese Fruit Juice/Drink Market—Part I; Fruit Processing, vol. 3(1), 1993, JPP. 19–22.
Best, D., Research Identifies Alternate Milk Processes. Time and Temperature Offer Targets of Opportunity; Diary Foods, vol. 94(13), 1993, p. 48.
Seyderhelm, I., Reduction of *Bacillus Stearothermophilus* Spores by Combined High Pressure and Temperature Treatments; J. Food Industry, vol. 43(4), 1992, pp. 17–20.
Fornari, C., et al., Inactivation of Bacillus Endospores by High–Pressure Treatment; Industria Conserve, vol. 70(3), 1995, pp. 259–265.
Maggi, A., et al., Effects of Combined High Pressure–Temperature on *Clostridium Sporogenes* Spores in Liquid Media; Industria Conserve, vol. 71(1), 1996, pp. 8–14.
Patent Abstracts of Japan, vol. 017, No. 124 (C–1035), Mar. 16, 1993, JP 04 304838 A (Toppan Printing Co. Ltd.), Oct. 28, 1992.
Maggi, A., et al., Use of High Pressure for Inactivation of *Butyric Clostridia* in Tomato Serum; Industria Conserve, vol. 70(3), 1995, pp. 289–293.
Salc A., and Gould, G., Inactivation of Bacterial Spores by Hydrostatic Pressure; J. of General Microbiology, vol. 60, 1970, pp. 323–334.
Okazaki, T., et al., Combined Effects of Temperature and Pressure on Sterilization of *Bacillus Subtilis* Spores; J. of Japanese Soc. of Food Science & Technology, (Nippon Shokuhin Kogyo Gakkaishi), vol. 41(8), 1994, pp. 536–541.
Butz, P. et al., Ultra–High Pressure Processing of Onions: Chemical and Sensory Changes; Lebensmittel–Wittenschaft und Technologie, vol. 27(5), 1994, pp. 463–467.

* cited by examiner

*Primary Examiner*—Milton Cano
(74) *Attorney, Agent, or Firm*—Fulbright & Jaworski L.L.P.

(57) ABSTRACT

Method for sterilizing foods using both ultra-high pressures and high temperatures. The instantaneous temperature change that occurs when pressure is applied combines a high-temperature short-time process with ultra-high pressure to deliver a fast and therefore gentle thermal process to a pre-packaged product. The process involves heating a food to a pre-pressurized temperature, subjecting the food to ultra-high pressure, which instantaneously raises the temperature of the food, and then releasing the pressure so that the temperature returns to the original pre-pressurized temperature. The method leverages the adiabatic temperature rise which occurs when the food is hydrostatically pressurized, coupled with the lethality of the pressure, to achieve appropriate sterilization conditions. The disclosure also includes foods which have been sterilized using both ultra-high pressures and high temperatures.

11 Claims, 6 Drawing Sheets

HIGH TEMPERATURE/ULTRA HIGH PRESSURE STERILIZATION OF FOODS

This application is continuation of U.S. application Ser. No. 08/572,656 filed Dec. 14, 1995, now U.S. Pat. No. 6,086,936.

BACKGROUND OF THE INVENTION

1. Field of the Invention

This invention relates to a method of sterilizing foods using a combination of ultra-high pressure and elevated temperatures. More particularly, the invention relates to using the synergy between the adiabatic temperature rise that occurs when a material is hydrostatically pressurized, coupled with the lethality of the pressure to achieve the appropriate sterilization conditions.

2. Description of the Related Art

The potential to process certain foods using ultra-high pressure (UHP) sterilization has been known since the turn of the century when hydrostatic pressures in excess of 100,000 psi at ambient temperatures were tested and it was established to have a lethal effect on vegetative bacteria. The process involves pressurizing a material (in this case a food) to ultra-high pressures (50,000 to 150,000 psi and higher). This process is very effective at eliminating vegetative bacteria, yeast and molds. The treatment is uniform throughout the product and much faster in its ability to inactivate microorganisms than standard batch sterilization processes which heat the food product slowly through conduction. UHP is often referred to as a "heatless" or "cold pasteurization" method. In the literature, it was believed that UHP was not very effective at destroying bacterial spores or denaturing enzymes. These are the primary requirements for processing low acid, shelf stable, canned foods.

The recent increase in consumer interest in higher quality foods has caused the food industry to become interested in UHP since standard practice provides only for low temperature pasteurization of low acid products and commercial sterilization of high acid products. The advantage of UHP over typical thermal processes is the potential to increase shelf life without significantly degrading the nutritional characteristics, flavor and color quality of the food. Chemical reactions/degradation that occur as a result of thermal treatment are virtually eliminated and the process is potentially more economical from an energy utilization perspective.

The Japanese were the first to commercialize UHP in 1990 when MEIDI-YA introduced a UHP preserved jam into the retail market. Currently, several high acid UHP processed products can be found in the Japanese market, including fruit, yogurt, jams, jellies and fruit sauces.

Ultra-high pressure bacterial inactivation is not well understood. It is believed that microbes are destroyed through altered permeability of the cell membranes from mechanical disruption as well as protein denaturation due to the disruption of hydrophobic bonds, ionic bonds and subsequent unfolding of the protein structure. In contrast, thermal protein denaturation and to a large extent microbiological inactivation is due to the destruction and creation of covalent bonds. It is currently believed that the UHP process is only effective for inactivating vegetative bacteria, yeast and molds.

Therefore commercial treatments are limited to high acid food sterilization or low acid food pasteurization. Low acid food pasteurization involves heating the product to 60–100° C. and is only effective for inactivating non-spore forming pathogens. The sterilization process is particularly severe because of the time required to heat the entire product, particularly the center of the product, to the treatment temperature (>100° C.). That is, by the time the center core of the product achieves the desired peak treatment temperature for the desired period of time, the outer portions of the product have been overtreated. Accordingly, low acid food sterilization, particularly in packaging (which tends to insulate the product), is undesirable since the extended time for thermal treatment often degrades the characteristics of the product.

The following references and those referred hereinafter, each of which are hereby incorporated by reference, disclose the state of the art.

Japanese Patent Publication 225 7864 to Ajinomoto discloses pressure sterilization of bacterial spores. The publication discloses sterilizing bacterial spores under pressure by treating a food product for 5 to 300 minutes at 30 to 100° C. under a pressure of 1,000 to 10,000 kg/cm$^2$ (70–700 psi) (not ultra-high pressure).

Japanese Patent Publication 318 3450 to Dainippon Printing discloses the preparation of cut vegetables involving the step of pasteurizing the product by applying a pressure of at least 1,000 kg/cm$^2$ (70 psi) (not ultra-high pressure).

Australian Patent Publication 42 50 72 to Donald discloses the sterilization of food compositions. The disclosed process includes raising the pressure of a previously heated food product, injecting steam into the pressurized chamber to allow the steam to condense onto the product, raising the temperature of the composition and subsequently releasing the pressure. The publication discloses that the composition is held at a pressure such that the steam is condensed to water donating its latent heat energy to the surrounding composition and subsequently lowering the pressure, causing the condensed water to flash off, taking its latent heat energy from the composition and thus cooling it.

Although high pressure sterilization has been used to treat high acid foods in the past, the prior art does not disclose the ultra-high pressure sterilization of low acid foods. It would be desirable to develop a method of processing foods to commercial sterility without subjecting the food to thermal degradation.

OBJECTS OF THE INVENTION

It is an object of the present invention to overcome the above-mentioned difficulties in the prior art.

It is another object of the present invention to provide a method of sterilizing low acid foods using ultra-high pressure.

It is a further object of the present invention to provide a method of sterilizing low acid foods using ultra-high pressures and high temperatures.

It is an additional object of the present invention to provide a method of sterilizing foods using an instantaneous adiabatic temperature rise.

It is a still further object of the present invention to provide a method of achieving a specific targeted amount of lethality using the instantaneous adiabatic temperature rise.

It is yet another object of the present invention to provide a commercially sterile food product processed by these methods.

These and other objects and advantages of the present invention will become further apparent from the teachings hereinafter provided by the detailed description, test data and examples.

SUMMARY OF THE INVENTION

The invention relates to a method of sterilizing low acid foods using a combination of ultra-high pressure and elevated temperatures. The instantaneous adiabatic temperature change that occurs when pressure is applied to a food composition combines a high-temperature short-time process with ultra-high pressure to deliver a fast and therefore gentle thermal process to a prepackaged product.

The destruction of microorganisms relates to the destruction of life at the single cell level (Pflug et al, "principles of the thermal destruction of microorganisms", *Disinfection, Sterilization and Preservation*, fourth edition, edited by Seymour Block). One particular microorganism that is a target of thermal sterilization processes is *Clostridium botulinum*. *C. botulinum* in a food is not dangerous unless it can develop into a toxin-producing vegetative culture. Growth depends on the food satisfying the nutritional requirements of the organisms. However, the growth also depends on other factors (see *Food Born Diseases*, edited by Dean Cliver, pages 116–120 and *Basic Food Microbiology*, second edition, by George Banwart, pages 219–239).

The invention achieves commercial sterility of low acid food products, that is, inactivates all spores capable of growing under the intended storage conditions. The invention results in a 10+ log spore kill (eliminates $10^{10}$ spores or more). Products prepared using the invention have a fresher appearance compared to the conventional cooked products because the products treated according to the invention are exposed to high temperatures for only short periods of time. Since extensive high temperature treatments are avoided, the invention also provides additional recipe flexibility and product claims compared to thermally processed products because temperature sensitive additives can be used more readily.

One embodiment of the invention involves heating a food to a pre-pressurized temperature, subjecting the food to ultra-high pressure, which instantaneously raises the temperature adiabatically, and then releasing the pressure so that the temperature returns to the original pre-pressurized temperature. The technique leverages the adiabatic temperature rise which occurs when a food material is hydrostatically pressurized, coupled with the lethality of the pressure, to achieve appropriate sterilization conditions. The process achieves a 10+ log spore kill (detection sensitivity of the testing to date) of mesophilic, anaerobic and thermophilic spores (*B. subtilis, C. sporogenes* and *B. stearothermophilus*) by coupling pascalization with elevated temperatures.

DETAILED DESCRIPTION OF THE INVENTION

The presently disclosed methods provide a new way of sterilizing and processing foods, particularly low acid canned foods, that is faster, more energy efficient and less detrimental to product quality than conventional thermal canning (hydrostatic cooker and retort) processes. The present invention offers several advantages over current sterilization technology. The primary advantage is the ability to sterilize low acid foods with increased efficiency. Process cycle times are dramatically reduced by eliminating the conventional pressurized (30–35 psi) heat up, hold and cool down cycle time. According to the present method, for example, a product can be quickly heated via conventional UHT equipment to 80–99° C., packaged, loaded into a pascalization chamber filled with a preheated medium, pressurized to 50,000–150,000 psi, preferably 70,000–130,000 psi, decompressed, and then transferred to a cooling trough to chill the product from 80–99° C. to ambient conditions.

The sterilization conditions of the invention are achieved with lower peak temperatures and much shorter hold times since the ultra-high pressure and temperature combination contribute synergistically to the lethality of the process. Neither the pressure nor temperature conditions alone would provide the synergistic lethality of the combination. In addition, the thermal degradation reactions that occur in conventionally sterilized pre-packaged products are greatly reduced due to the short duration of thermal exposure at the high temperature ranges. This reduces vitamin and nutritional deterioration and allows for the utilization of thermally sensitive, natural additives and colorants. Flavor deterioration, thermally induced off-flavors, breakdown of gel and viscosity systems are also greatly reduced. An additional advantage is the reduction of thermal energy requirements and cooling water utilization. Furthermore, enzymes which could cause product deterioration are denatured and therefore inactivated.

The process according to the invention is similar to high temperature short time processes, but does not rely on the more complicated aseptic packaging conditions to maintain product sterility. In high temperature short time processes, the food product is heated to high temperatures (250° F. and up) external to the package and then directly packaged in sterile containers to avoid contamination. The invention avoids the use of both the high temperatures and complicated packaging requirements of the high temperature short time processes. The present invention allows for the treatment of the already-packaged product. These are some of the advantages of this invention over conventional thermal treatments or pascalization.

The presently disclosed process can be utilized to sterilize a variety of foods. These foods include pet foods (high moisture and semi-moisture), main meals, sauces, soups, stews, vegetables, beverages and juices.

Preferably, the presently disclosed methods are utilized to sterilize low acid foods. Low acid foods are those having a pH $\geq 4.6$. High acid foods (pH <4.6), unlike low acid foods, are not prone to the growth of pathogens. It is these pathogens that are particularly susceptible to the synergistic effect of the present process.

The present invention preferably uses a combination of both ultra-high pressure and high temperatures to sterilize a low acid food. The pre-pressurized temperature is preferably greater than ambient temperature (20° C.), more preferably greater than about 75° C. Preferably, the pre-pressurized temperature is less than about 105° C. At temperatures above 100° C., water may turn to steam which can cause complications. However, additives, such as salt, can be used to increase the boiling temperature of water.

The ultra-high pressure is greater than about 75,000 psi, preferably greater than about 90,000 psi, even more preferably greater than about 100,000 psi and most preferably greater than about 125,000 psi, and less than about 250 Kpsi.

Preferably, hydraulic means are used to apply isostatic pressure. The food product is preferably in a package. The package may contain gas, which will become compressed during pressurization. Preferably, the package is hermetically sealed.

The high temperature is achieved by an adiabatic temperature increase due to the pressurization. When materials are exposed to ultra-high pressures, the temperature of the material rises instantaneously when the pressure is applied and immediately returns to its starting temperature when the pressure is released. At 100,000 psi, adiabatic heating of water increases the temperature approximately 20° C., whereas castor oil rises 40° C. Tests have demonstrated a 27° C. adiabatic temperature rise in a model wet pet food at 90,000 psi.

This transposable temperature change is explained by the ideal gas law. Applying the ideal gas law to solid and liquid materials, which marginally compress, the temperature will rise when pressure is applied and decline when the pressure is released. This instantaneous temperature change that occurs when pressure is applied provides the ability to couple a high-temperature short-time process with ultra-high pressure to deliver a fast and therefore gentle thermal process to a prepackaged product. The additional lethality of the process is primarily based on the peak temperature achieved under pressure. The peak temperature depends on the starting temperature (pre-pressurized temperature) and the adiabatic temperature rise which occurs instantaneously when a material is pressurized. This temperature increase is instantaneous and uniform throughout the product, relying on neither conductive nor convective forces to transfer the thermal energy. The peak temperature ranges from about 100° C. to about 160° C., preferably about 110° C. to 150° C. and even more preferably about 120° C. to 140° C.

Neither the time-temperature nor the ultra-high pressure conditions alone is enough to sterilize low acid food products. The combination, however, achieves greater than about 95% bacterial spore inactivation. Preferably, the bacterial spore inactivation is greater than about 99%, more preferably greater than about 99.9%, and even more preferably about 100%. The process results in a 10+ log spore kill and achieves commercial sterility.

One embodiment of the present invention includes the step of heating a food product to an initial pre-pressurized temperature, pressurizing to an ultra-high pressure, thereby instantaneously increasing the temperature due to the adiabatic temperature rise, decompressing the product, thereby returning the temperature to the original initial pre-pressurized temperature and subsequently cooling the product from the initial pre-pressurized temperature to room temperature, resulting in a sterilized product.

The pre-pressurized temperature is preferably greater than about 75° C., more preferably about 80° C., and even more preferably 85° C., and less than about 105° C.

Another embodiment of the present invention relates to sterilizing a food product utilizing an instantaneous temperature rise, preferably resulting from the application of ultra-high pressure.

In another embodiment of the invention, a method utilizing the instant adiabatic temperature rise is used to achieve a specific targeted required amount of lethality. The lethality of a thermal process is normally expressed in terms of an $F_0$. The $F_0$ value is based on a temperature/time relationship and is used to equate thermal processes to a known process at 121.1° C. An $F_0$ of 1 is equal to processing a material at 121.1° C. for 1 minute. This can also be achieved by processing at 105° C. for much greater than 1 minute or at 130° C. for somewhat less than 1 minute. Depending on the attributes of a product, this allows the food processor some flexibility on how a food is processed.

Since the center portions of a product require a period of time to pass before reaching the targeted temperature, it is difficult to obtain the required lethality throughout the entire product without overtreating the outer portions. The disclosed process provides an instantaneous adiabatic temperature rise which results in an instantaneous uniform temperature increase throughout the entire product. Accordingly, a specific $F_0$ target can be achieved without overtreating portions of the product.

For example, a pre-packaged product can be heated to a pre-pressurized temperature which does not degrade the product, pressurized with ultra-high pressure resulting in an instantaneous temperature increase throughout the product for a specific period of time and then de-pressurized and cooled. According to this embodiment a specific target $F_0$ can be achieved (i.e. an instantaneous temperature increase to 121.1° C. for 1 minute to achieve an $F_0$ of 1). Therefore an important aspect of the invention relates to the ability to achieve a specific $F_0$ lethality level throughout an entire bulk product (packaged or not packaged) without overtreating or overexposing portions of the product to the thermal treatment.

Additional objects, advantages and features of the various aspects of the present invention will become apparent from the following description of the preferred embodiments, such description being given in conjunction with the accompanying drawings.

DESCRIPTION OF THE PREFERRED EMBODIMENTS

Figure 1:
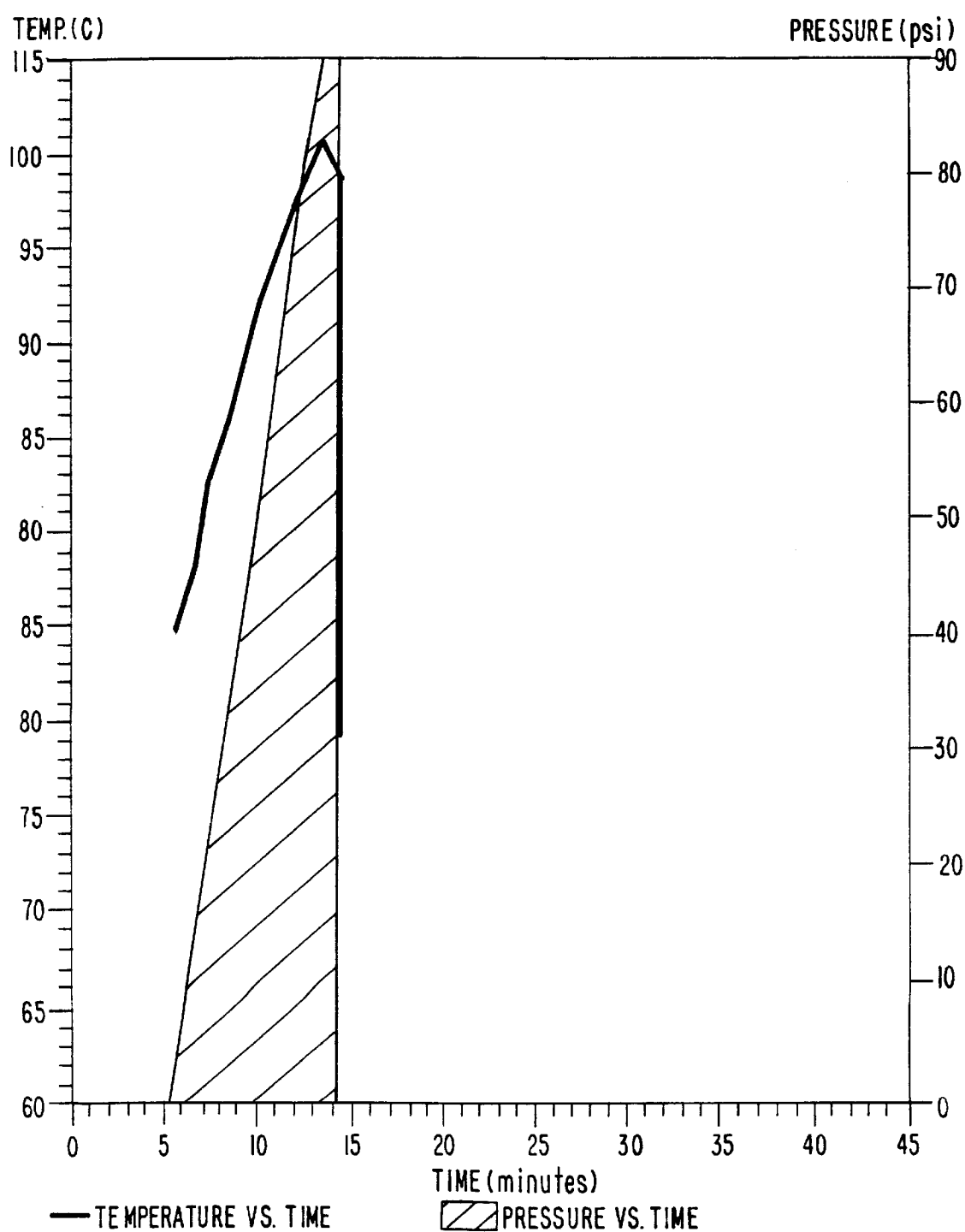
FIG. 1 illustrates a graphical representation of a time-temperature-pressure relationship of one embodiment of the ultra-high pressure process according to the present invention wherein the left vertical axis represents temperature, the right vertical axis represents pressure, and the horizontal axis represents time.

Referring initially to FIG. 1, a graphical representation illustrates the time-temperature-pressure relationship for the UHP process of Set A of Example 4. The left vertical axis represents temperature, the right vertical axis represents pressure and the horizontal axis represents time. The temperature of the product during treatment is shown by a curve. The pressure is shown by the shaded region. The pre-pressurized temperature was about 85° C. and the maximum pressure was 90,000 psi applied for about one minute.

Figure 2:
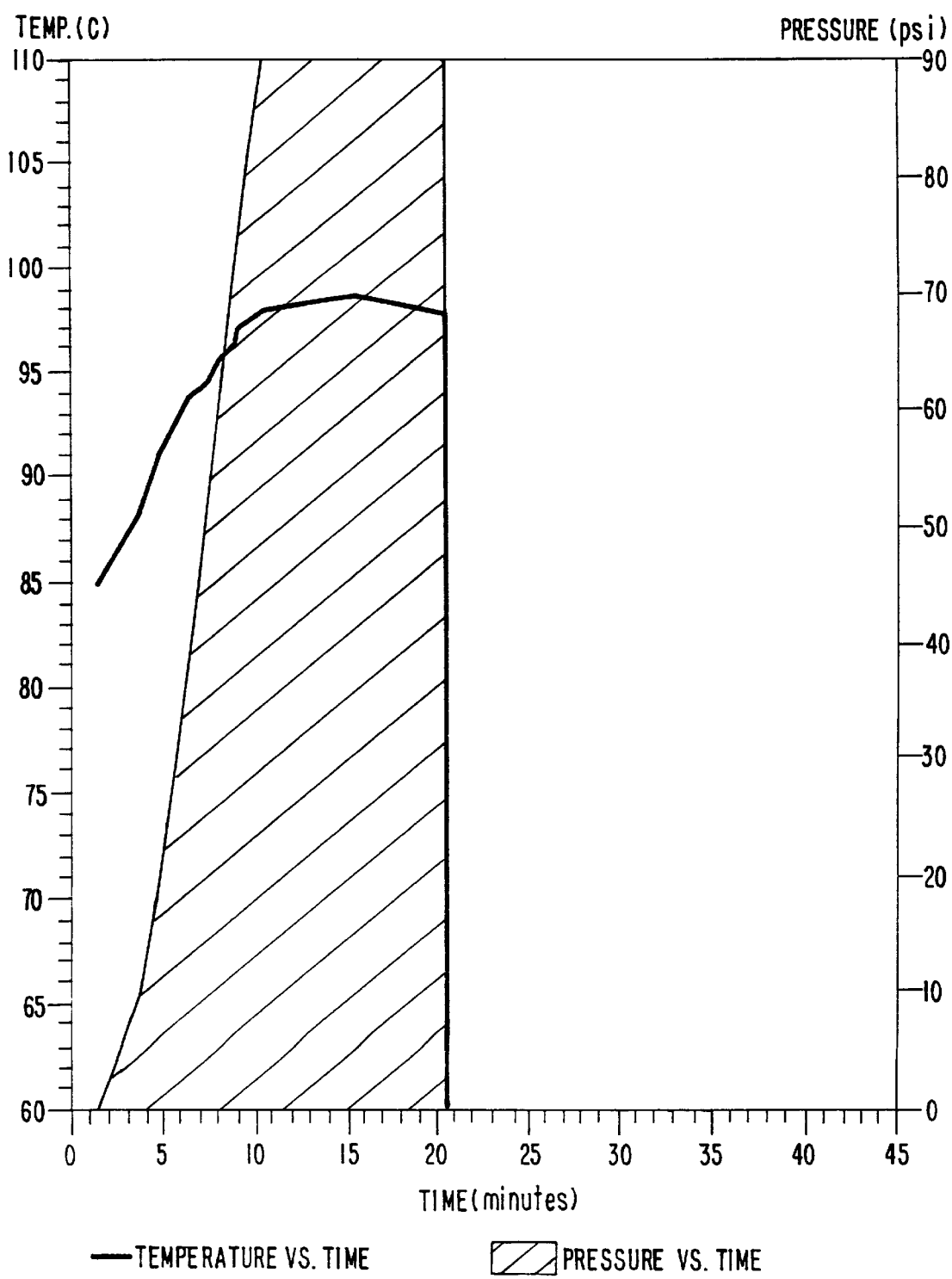
FIG. 2 illustrates a graphical representation of a time-temperature-pressure relationship of another embodiment of the ultra-high pressure process according to the present invention wherein the left vertical axis represents temperature, the right vertical axis represents pressure, and the horizontal axis represents time.
Figure 3:
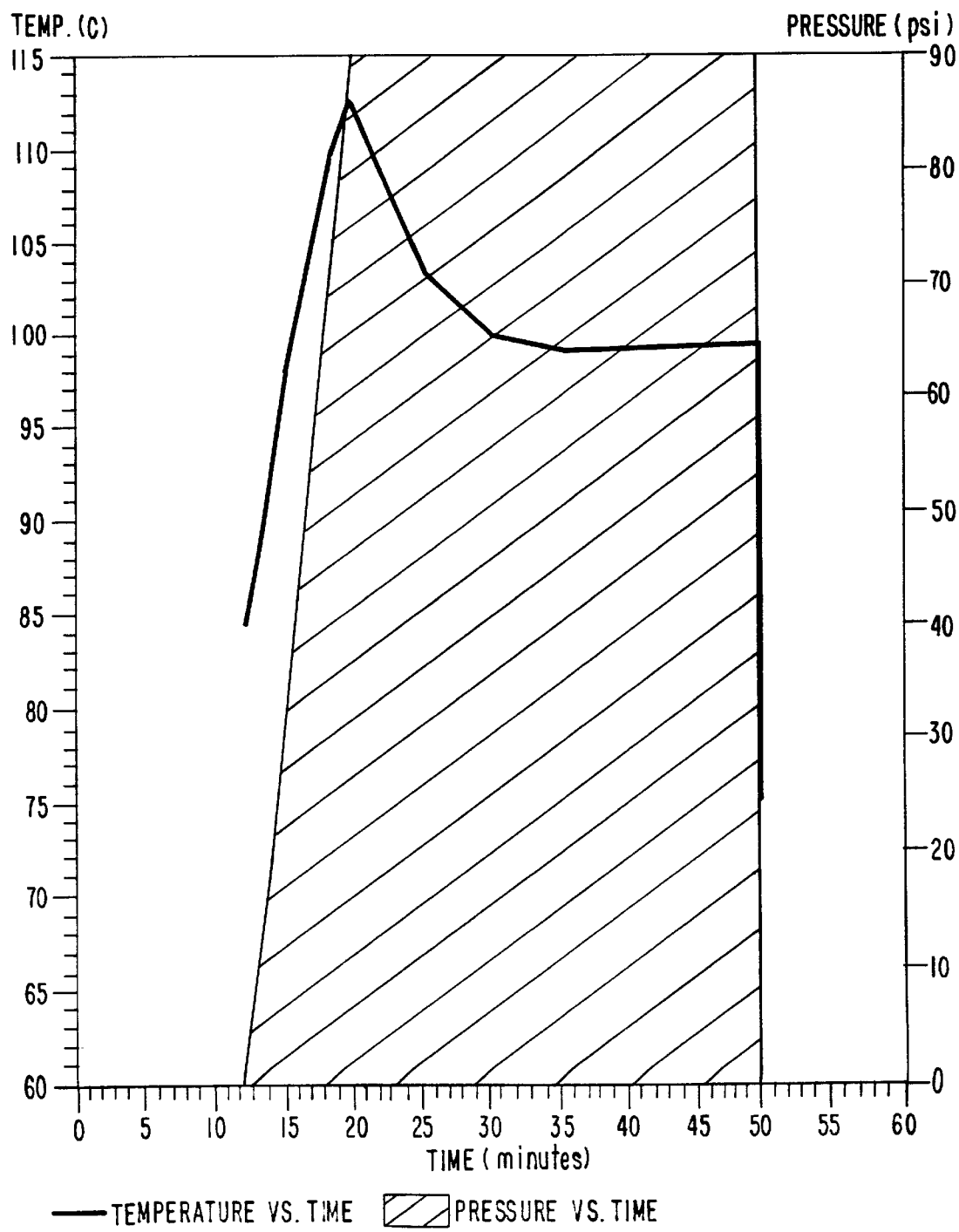
FIG. 3 illustrates a graphical representation of a time-temperature-pressure relationship of another embodiment of the ultra-high pressure process according to the present invention wherein the left vertical axis represents temperature, the right vertical axis represents pressure, and the horizontal axis represents time.
Figure 4:
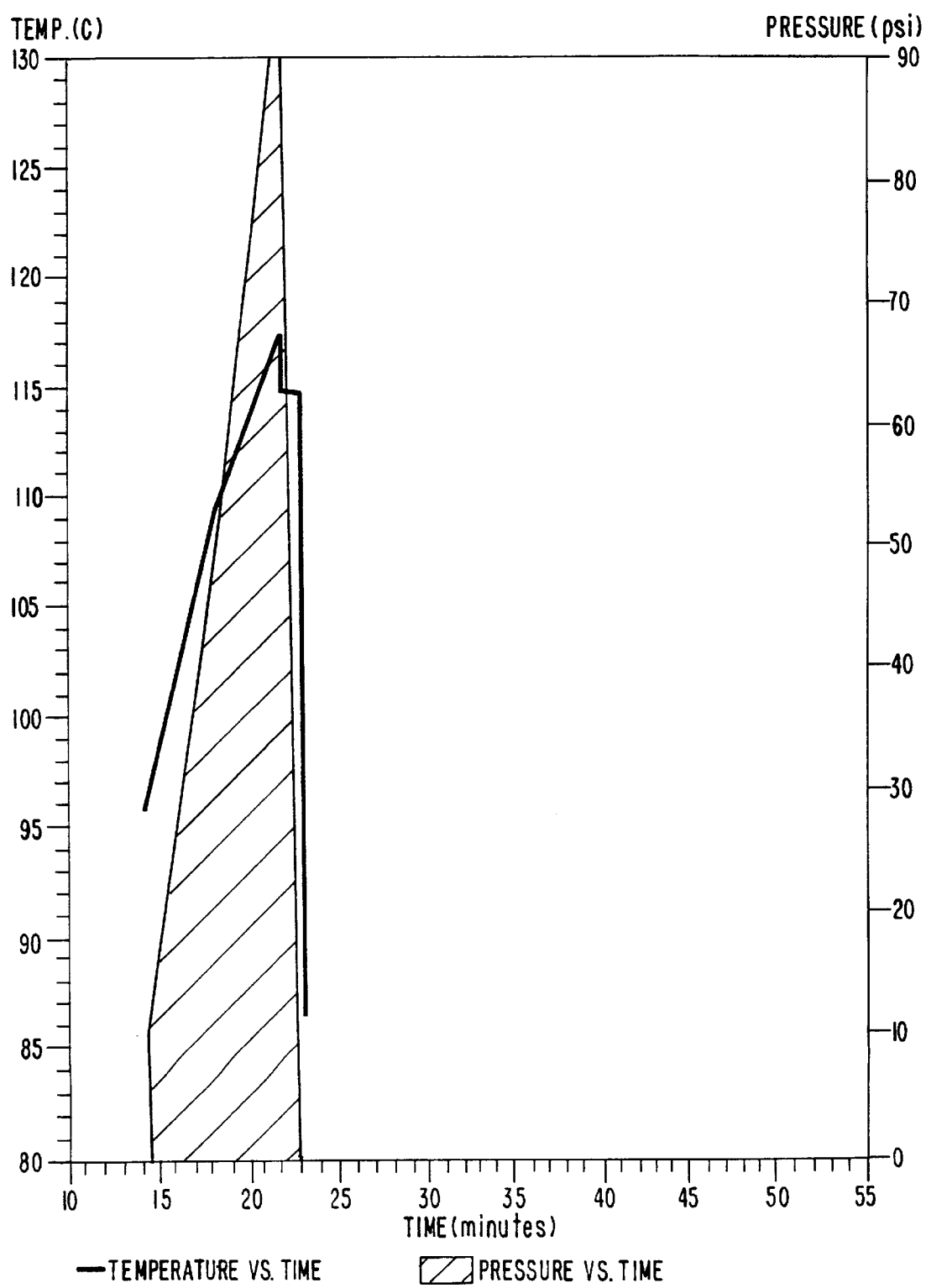
FIG. 4 illustrates a graphical representation of a time-temperature-pressure relationship of another embodiment of the ultra-high pressure process according to the present invention wherein the left vertical axis represents temperature, the right vertical axis represents pressure, and the horizontal axis represents time.
Figure 5:
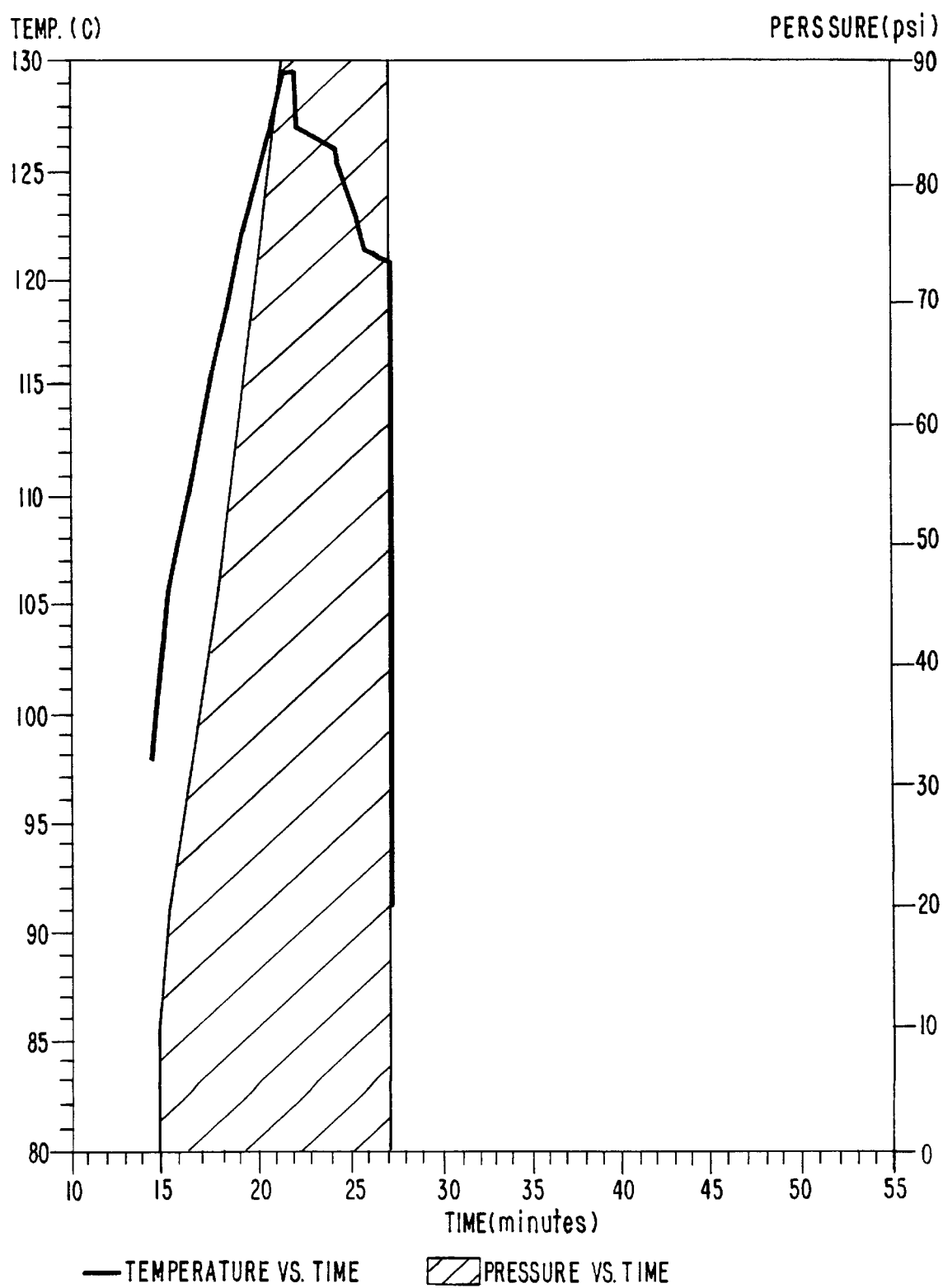
FIG. 5 illustrates a graphical representation of a time-temperature-pressure relationship of another embodiment of the ultra-high pressure process according to the present invention wherein the left vertical axis represents temperature, the right vertical axis represents pressure, and the horizontal axis represents time.
Figure 6:
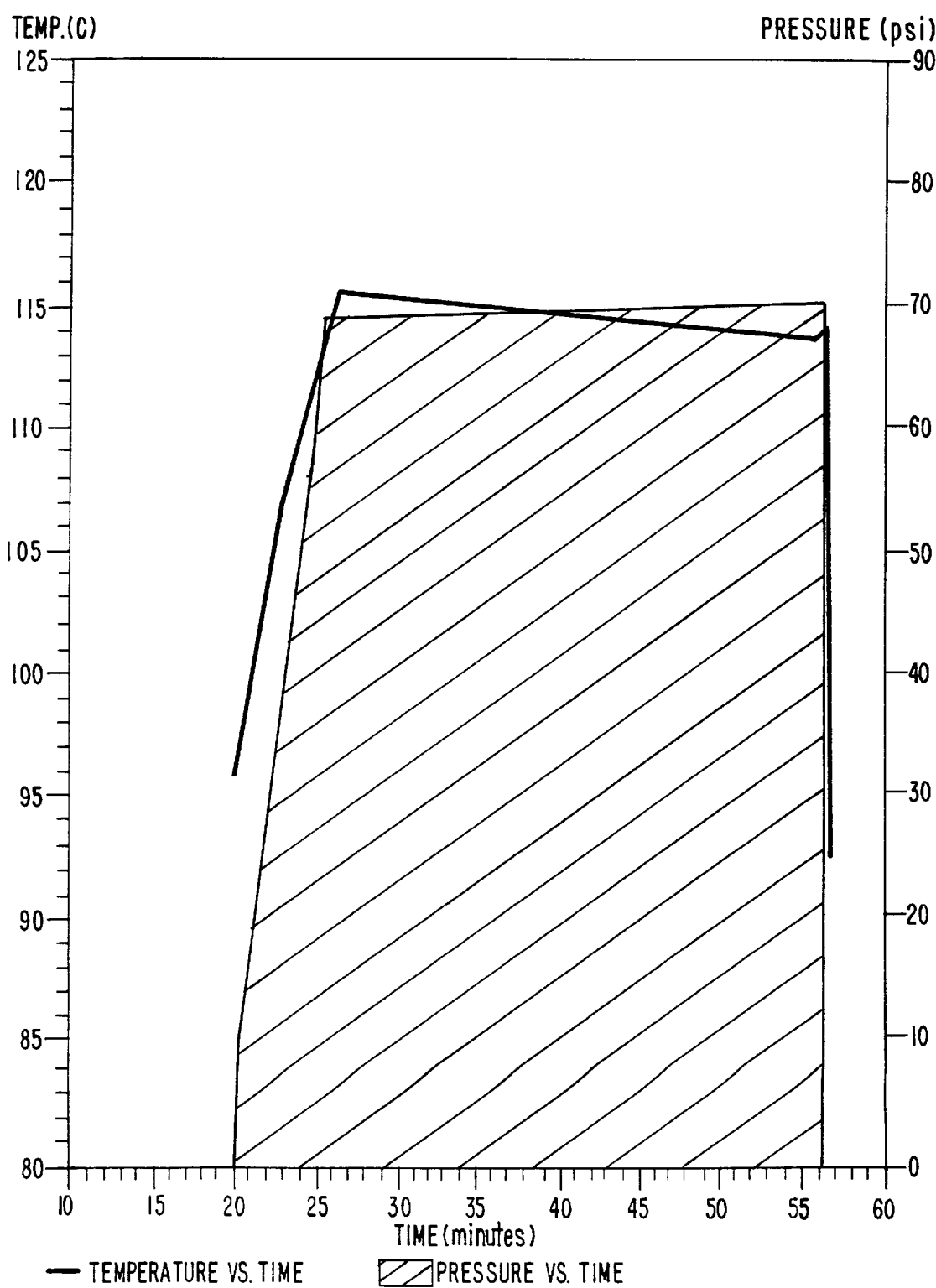
FIG. 6 illustrates a graphical representation of a time-temperature-pressure relationship of another embodiment of the ultra-high pressure process according to the present invention wherein the left vertical axis represents temperature, the right vertical axis represents pressure, and the horizontal axis represents time.

FIG. 2 illustrates a graphical representation of the UHP process performed in Set B of Example 4 where the pre-pressurized temperature was 85° C. and the pressure was 90,000 psi applied for about five minutes. FIG. 3 illustrates a graphical representation of the UHP process performed in Set C of Example 4 where the pre-pressurized temperature was 85° C. and the pressure was 90,000 psi applied for about 30 minutes. FIG. 4 illustrates a graphical representation of the UHP process performed in Set D of Example 4 where the pre-pressurized temperature was 98° C. and the pressure was 90,000 psi applied for about one minute. FIG. 5 illustrates a graphical representation of the UHP process performed in Set E of Example 4 where the pre-pressurized temperature was 98° C. and the pressure was 90,000 psi applied for about five minutes. FIG. 6 illustrates a graphical representation of the UHP process performed in Set F of Example 4 where the pre-pressurized temperature was 98° C. and the pressure was 90,000 psi applied for thirty minutes.

EXAMPLES

Example 1

Fifty gram quantities of raw meat emulsion were individually weighed into each of four test pouches (heat sealable plastic pouches) per each UHP precondition/process evaluated. Pre-pressurized temperatures of up to and greater than 80° C. and pressures of up to and greater than 120,000 psi were used. The purpose of this study was to evaluate the effect of various additives such as surfactants, sodium chloride, and chelating agents (EDTA). A *Bacillus subtilis* spore strip was individually placed into each of 2 pouches per precondition/process prior to sealing to determine sporicidal activity. All pouches were stored on ice for 24 hours prior to processing.

All samples were stored under refrigeration (4° C.) after processing. The pouches containing spore strips were analyzed for total aerobic and anaerobic count, total aerobic and anaerobic spores, fecal Streptococci, yeast/mold, and *Clostridia B. subtilis* spore counts. The data was obtained by enumerating survivors on the spore strips.

Conclusions:

Microbial reductions of 3 to 7 log units per gram were obtained. Pascalization was effective in inactivating vegetative organisms, yeast and molds. Microbial spores were not completely inactivated under the conditions evaluated. Anaerobic spores were more resistant to pascalization then aerobic. The degree of spore inactivation increased as the sample pre-conditioning temperature was raised above 80° C. Higher pressures (120,000 psi) further enhanced the sporicidal activity from the increased adiabatic rise in temperatures. The use of carbon dioxide, vacuum, or nitrogen had no effect on process lethality. Furthermore, it was found the additives also had no adverse effect on process lethality.

Example 2

Thirty seven test variations were evaluated. The testing used a media control system with the spores contained in a phosphate buffer. This enabled the evaluation of the effects of the processing conditions on the spores without any variation due to the influence of other substances. This included multi-staged pressurization, sample pre-conditioning and incorporation of chemical agents (15 evaluated) to enhance pressure effects. Various processing parameters including (a) pressures of 100 Kpsi and pre-pressurized temperatures of 100° C. for 1 minute, (b) multistage pressurization using pressures of 7,500 and 60,000 (consecutive 10 minute exposures to each pressure) and (c) pressures of 120 Kpsi with a pre-pressurized temperature of 80° C. for 1 minute. Three individual pouches, containing 1 *B. subtilis* spore strip each, were exposed per treatment (process varied and/or chemicals added). After processing, the pouches were stored under refrigeration until assayed for surviving spores. Two of the 3 pouches per treatment were individually cultured for sterility by aseptically transferring the strip into sterile 10 milliliter volumes of trypticase soy broth (Difco®). The cultures were incubated at 35° C. for 7 days and evaluated for signs of growth. No growth signified strip sterility.

The remaining third strip per process was used for enumerating the level of surviving spores. The strip and pouch contents were thoroughly mixed and diluted using saline. The dilutions were individually transferred onto each of 2 trypticase soy agar plates and incubated at 35° C. for 72 hours. The number of colony forming units per milliliter was determined by counting the colonies on each plate and multiplying by the dilution factor.

Conclusions:

Pressures of 100 Kpsi and peak temperatures of 100° C. for 1 minute were not sufficient to inactivate 6 logs of *B. subtilis* spores. Total spore inactivation was achieved, however, by exposing the *B. subtilis* spores to a pressure of 120 Kpsi with a pre-pressurized temperature of $\geq$80° C. for 1 minute. The addition of sodium bicarbonate (2%), propionic acid (1%) or sodium chloride ($\geq$5%) served to protect the spores from inactivation and reduce the effectiveness of the treatment.

Multistage pressurization using pressures of 7,500 and 60,000 psi did not inactivate 6 logs of *B. subtilis* spores. Survival of the spores was observed after consecutive 10 minute exposures to each pressure.

Increased sporicidal activity was observed in the media system (Example 2) compared to that of the emulsified meats (Example 1). It can be assumed that fat, protein and other substances serve t o protect spores from inactivation by high isostatic pressures.

Example 3

Thirty gram quantities of raw, emulsified meat were individually weighed into plastic heat sealable pouches followed by inoculation with a mixed spore culture (*Clostridium sporogenes, Bacillus subtilis* and *Bacillus stearothermophilus*). A raw uninoculated set of the same meat served as a control. The inoculation procedure was repeated using presterilized material. All bags were heat sealed following inoculation, then stored on ice until pascalized.

The samples and processing chamber were preconditioned to temperatures of 75° C., 85° C. or 95° C. prior to pascalization at 90 Kpsi. Three samples from both the raw and presterilized group were evaluated per process conditions. The samples were exposed to each temperature/pressure combination for up to 30 minutes. Following pascalization, the samples were stored on ice until evaluated for surviving microorganisms. However, visual inspection of the heat seals demonstrated that they failed during processing and hermetic integrity was not maintained. Seal failure was also evident in the outgrowth study where bacterial growth was observed; however, no presence of the inoculated spores were measured (within the sensitivity of the test) in the same variables. Therefore, it is assumed that outgrowth was due to post process contamination.

Two samples from each group/process were analyzed for total aerobic, anaerobic and thermophilic spores. The remaining sample per group/process was incubated for 37° C. for 7 days, then analyzed for commercial sterility.

Conclusions:

The results demonstrated a challenge spore level of 6 logs per package, somewhat below the targeted 13 log level. The challenge spore level is the amount of spores the test sample is inoculated with. The shortfall in challenge spores was related to spore germination during sample shipment.

The evaluated test conditions provided up to a 5 log reduction in spore population for all inoculated organisms. The results from the commercial sterility tests indicated that post process contamination occurred. However, it appears that a process as low as 1 minute at 85° C. (preconditioning temperature) may be capable of producing a 6 log reduction for the 3 inoculated organisms.

Example 4

Thirty gram quantities of raw, emulsified meat were individually weighed into plastic heat sealable pouches followed by inoculation with a mixed spore culture (*Clostridium sporogenes, Bacillus subtilis* and *Bacillus stearothermophilus*). A raw uninoculated set served as a control. The inoculation procedure was repeated using presterilized material. All bags were heat sealed following inoculation, then stored on ice until pascalized.

The samples and processing chamber were preconditioned to temperatures of 85° C. or 98° C. prior to pascalization at 90 Kpsi. Three samples from both the raw and presterilized group were evaluated per process condition. The samples were exposed to each temperature/pressure combination for up to 30 minutes. Following pascalization, the samples were stored on ice until evaluated for surviving microorganisms. Tables 1 through 6 identify the processing conditions for Test Sets A–F of Example 4.

TABLE 1

Example 4: SET A
Duration of application peak pressure: 1 minute
Pre-pressurized temperature: 85° C.

| STAGE | Time (h:m:s) | Time (minutes) | Pressure (K psi) | Product Temp. (F.) | Product Temp. (C.) |
|---|---|---|---|---|---|
| HEAT | 00:00:00 | 0.00 | 0 | 60 | 15.6 |
|  | 00:01:00 | 1.00 | 0 | 125 | 51.7 |
|  | 00:04:00 | 4.00 | 0 | 180 | 82.2 |
|  | 00:05:20 | 5.33 | 0 | 184 | 84.4 |
| PRESSURIZING | 00:05:20 | 5.33 | 0 | 184 | 84.4 |
|  | 00:06:15 | 6.25 | 10 | 190 | 87.8 |
|  | 00:07:00 | 7.00 | 20 | 198 | 92.2 |
|  | 00:08:00 | 8.00 | 30 | 204 | 95.6 |
|  | 00:08:50 | 8.83 | 40 | 211 | 99.4 |
|  | 00:09:35 | 9.58 | 50 | 216 | 102.2 |
|  | 00:10:20 | 10.33 | 60 | 220 | 104.4 |
|  | 00:11:05 | 11.08 | 70 | 224 | 106.7 |
|  | 00:11:40 | 11.67 | 80 | 227 | 108.3 |
|  | 00:12:35 | 12.58 | 90 | 231 | 110.6 |
| HOLD | 00:12:35 | 12.58 | 90 | 231 | 110.6 |
|  | 00:13:35 | 13.58 | 90 | 227 | 108.3 |
| DECOMPRESSION | 00:13:35 | 13.58 | 90 | 227 | 108.3 |
|  | 00:14:00 | 14.00 | 0 | 174 | 78.9 |

TABLE 2

Example 4: SET B
Duration of application peak pressure: 5 minutes
Pre-pressurized temperature: 85° C.

| STAGE | Time (h:m:s) | Time (minutes) | Pressure (K psi) | Product Temp. (F.) | Product Temp. (C.) |
|---|---|---|---|---|---|
| HEAT | 00:00:00 | 0.00 | 0 | 60 | 15.6 |
|  | 00:01:00 | 1.00 | 0 | 181 | 82.8 |
|  | 00:01:30 | 1.50 | 0 | 185 | 85.0 |
| PRESSURIZING | 00:01:30 | 1.50 | 0 | 185 | 85.0 |
|  | 00:03:45 | 3.75 | 10 | 191 | 88.3 |
|  | 00:04:45 | 4.75 | 20 | 196 | 91.1 |
|  | 00:05:45 | 5.75 | 30 | 199 | 92.8 |
|  | 00:06:30 | 6.50 | 40 | 201 | 93.9 |
|  | 00:07:20 | 7.33 | 50 | 202 | 94.4 |
|  | 00:08:00 | 8.00 | 60 | 204 | 95.6 |
|  | 00:08:45 | 8.75 | 70 | 205 | 96.1 |
|  | 00:09:25 | 9.42 | 80 | 207 | 97.2 |
|  | 00:10:14 | 10.23 | 90 | 208 | 97.8 |

TABLE 2-continued

Example 4: SET B
Duration of application peak pressure: 5 minutes
Pre-pressurized temperature: 85° C.

| STAGE | Time (h:m:s) | Time (minutes) | Pressure (K psi) | Product Temp. (F.) | Product Temp. (C.) |
|---|---|---|---|---|---|
| HOLD | 00:15:14 | 15.23 | 90 | 209 | 98.3 |
| | 00:20:14 | 20.23 | 90 | 207 | 97.2 |
| DECOMPRESSION | 00:20:14 | 20.23 | 90 | 207 | 97.2 |
| | 00:20:30 | 20.50 | 0 | 109 | 42.8 |

TABLE 3

Example 4: SET C
Duration of peak pressure: 30 minutes
Pre-pressurized temperature: 85° C.

| STAGE | Time (h:m:s) | Time (minutes) | Pressure (K psi) | Product Temp. (F.) | Product Temp. (C.) |
|---|---|---|---|---|---|
| HEAT | 00:00:00 | 0.00 | 0 | 65 | 18.3 |
| | 00:01:00 | 1.00 | 0 | 95 | 35.0 |
| | 00:04:00 | 4.00 | 0 | 142 | 61.1 |
| | 00:07:30 | 7.00 | 0 | 165 | 73.9 |
| | 00:12:20 | 12.33 | 0 | 184 | 84.4 |
| PRESSURIZING | 00:12:20 | 12.33 | 0 | 184 | 84.4 |
| | 00:13:10 | 13.17 | 10 | 190 | 87.8 |
| | 00:14:10 | 14.17 | 20 | 198 | 92.2 |
| | 00:15:00 | 15.00 | 30 | 207 | 97.2 |
| | 00:15:55 | 15.92 | 40 | 213 | 100.6 |
| | 00:16:40 | 16.67 | 50 | 219 | 103.9 |
| | 00:17:30 | 17.50 | 60 | 224 | 106.7 |
| | 00:18:10 | 18.17 | 70 | 228 | 108.9 |
| | 00:18:45 | 18.75 | 80 | 231 | 110.6 |
| | 00:19:35 | 19.58 | 90 | 234 | 112.2 |
| HOLD | 00:19:35 | 19.58 | 90 | 234 | 112.2 |
| | 00:25:00 | 25.00 | 90 | 217 | 102.8 |
| | 00:30:00 | 30.00 | 90 | 211 | 99.4 |
| | 00:35:00 | 35.00 | 90 | 209 | 98.3 |
| | 00:40:00 | 40.00 | 90 | 209 | 98.3 |
| | 00:45:00 | 45.00 | 90 | 209 | 98.3 |
| | 00:49:35 | 49.58 | 90 | 209 | 98.3 |
| DECOMPRESSION | 00:49:35 | 49.58 | 90 | 209 | 98.3 |
| | 00:49:50 | 49.83 | 0 | 165 | 73.9 |

TABLE 4

Example 4: SET D
Duration of peak pressure: 1 minute
Pre-pressurized temperature: 98° C.

| STAGE | Time (h:m:s) | Time (minutes) | Pressure (K psi) | Product Temp. (F.) | Product Temp. (C.) |
|---|---|---|---|---|---|
| HEAT | 00:00:00 | 0.00 | 0 | 60 | 15.6 |
| | 00:01:00 | 1.00 | 0 | 170 | 76.7 |
| | 00:04:00 | 4.00 | 0 | 191 | 88.3 |
| | 00:06:00 | 6.00 | 0 | 196 | 91.1 |
| | 00:10:00 | 10.00 | 0 | 202 | 94.4 |
| | 00:14:00 | 14.00 | 0 | 205 | 96.1 |
| | 00:14:30 | 14.50 | 0 | 205 | 96.1 |
| PRESSURIZING | 00:14:30 | 14.50 | 0 | 205 | 96.1 |
| | 00:15:20 | 15.33 | 10 | 211 | 99.4 |
| | 00:16:20 | 16.33 | 20 | 218 | 103.3 |
| | 00:17:15 | 17.25 | 30 | 224 | 106.7 |
| | 00:18:10 | 18.17 | 40 | 229 | 109.4 |
| | 00:19:00 | 19.00 | 50 | 232 | 111.1 |
| | 00:19:45 | 19.75 | 60 | 235 | 112.8 |
| | 00:20:30 | 20.50 | 70 | 238 | 114.4 |

TABLE 4-continued

Example 4: SET D
Duration of peak pressure: 1 minute
Pre-pressurized temperature: 98° C.

| STAGE | Time (h:m:s) | Time (minutes) | Pressure (K psi) | Product Temp. (F.) | Product Temp. (C.) |
|---|---|---|---|---|---|
| | 00:21:10 | 21.17 | 80 | 241 | 116.1 |
| | 00:21:50 | 21.83 | 90 | 243 | 117.2 |
| HOLD | 00:21:50 | 21.83 | 90 | 243 | 117.2 |
| | 00:21:50 | 21.83 | 90 | 238 | 114.4 |
| DECOMPRESSION | 00:22:50 | 22.83 | 90 | 238 | 114.4 |
| | 00:23:05 | 23.08 | 0 | 187 | 86.1 |

TABLE 5

Example 4: SET E
Duration of peak pressure: 5 minutes
Pre-pressurized temperature: 98° C.

| STAGE | Time (h:m:s) | Time (minutes) | Pressure (K psi) | Product Temp. (F.) | Product Temp. (C.) |
|---|---|---|---|---|---|
| HEAT | 00:00:00 | 0.00 | 0 | 65 | 18.3 |
| | 00:02:31 | 2.52 | 0 | 124 | 51.1 |
| | 00:05:00 | 5.00 | 0 | 161 | 71.7 |
| | 00:12:00 | 12.00 | 0 | 201 | 93.9 |
| | 00:13:10 | 13.17 | 0 | 204 | 95.6 |
| | 00:14:40 | 14.67 | 0 | 207 | 97.2 |
| PRESSURIZING | 00:14:50 | 14.83 | 0 | 208 | 97.8 |
| | 00:15:20 | 15.33 | 10 | 212 | 100.0 |
| | 00:16:25 | 16.42 | 20 | 222 | 105.6 |
| | 00:17:20 | 17.33 | 30 | 230 | 110.0 |
| | 00:18:15 | 18.25 | 40 | 239 | 115.0 |
| | 00:19:00 | 19.00 | 50 | 245 | 118.3 |
| | 00:19:45 | 19.75 | 60 | 251 | 121.7 |
| | 00:20:30 | 20.50 | 70 | 256 | 124.4 |
| | 00:21:10 | 21.17 | 80 | 260 | 126.7 |
| | 00:21:55 | 21.92 | 90 | 265 | 129.4 |
| HOLD | 00:21:55 | 21.92 | 90 | 265 | 129.4 |
| | 00:24:00 | 24.00 | 90 | 260 | 126.7 |
| | 00:24:05 | 24.08 | 90 | 258 | 125.6 |
| | 00:24:30 | 24.50 | 90 | 257 | 125.0 |
| | 00:25:00 | 25.00 | 90 | 255 | 123.9 |
| | 00:25:30 | 25.50 | 90 | 253 | 122.8 |
| | 00:26:30 | 26.50 | 90 | 250 | 121.1 |
| | 00:26:55 | 26.92 | 90 | 249 | 120.6 |
| DECOMPRESSION | 00:26:55 | 26.92 | 90 | 249 | 120.6 |
| | 00:26:12 | 26.02 | 0 | 195 | 90.6 |

TABLE 6

Example 4: SET F
Duration of peak pressure: 30 minutes
Pre-pressurized temperature: 98° C.

| STAGE | Time (h:m:s) | Time (minutes) | Pressure (K psi) | Product Temp. (F.) | Product Temp. (C.) |
|---|---|---|---|---|---|
| HEAT | 00:00:00 | 0.00 | 0 | 65 | 18.3 |
| | 00:03:00 | 3.00 | 0 | 212 | 100.0 |
| | 00:08:00 | 8.00 | 0 | 205 | 96.1 |
| | 00:10:00 | 10.00 | 0 | 198 | 92.2 |
| | 00:17:00 | 17.00 | 0 | 199 | 92.8 |
| | 00:19:00 | 19.00 | 0 | 204 | 95.6 |
| | 00:20:00 | 20.00 | 0 | 206 | 96.7 |
| PRESSURIZING | 00:20:10 | 20.17 | 0 | 207 | 97.2 |
| | 00:21:00 | 21.00 | 10 | 213 | 100.6 |
| | 00:22:00 | 22.00 | 20 | 220 | 104.4 |
| | 00:23:00 | 23.00 | 30 | 226 | 107.8 |
| | 00:23:50 | 23.83 | 40 | 230 | 110.0 |

TABLE 6-continued

Example 4: SET F
Duration of peak pressure: 30 minutes
Pre-pressurized temperature: 98° C.

| STAGE | Time (h:m:s) | Time (minutes) | Pressure (K psi) | Product Temp. (F.) | Product Temp. (C.) |
|---|---|---|---|---|---|
| | 00:24:35 | 24.83 | 50 | 235 | 112.8 |
| | 00:25:20 | 25.33 | 60 | 238 | 114.4 |
| | 00:26:10 | 26.17 | 70 | 241 | 116.1 |
| HOLD | 00:26:10 | 26.17 | 70* | 241 | 116.1 |
| | 00:55:25 | 55.42 | 70* | 236 | 113.3 |
| | 00:56:10 | 56.17 | 70* | 237 | 113.9 |
| DECOMPRESSION | 00:56:10 | 56.17 | 70* | 237 | 113.9 |
| | 00:56:30 | 56.50 | 0 | 198 | 92.2 |

*Pump out of fluid - 70K psi highest pressure reached

FIGS. 1 through 6 illustrate the UHP time-temperature-pressure relationship for each of Sets A through F of Example 4.

Two samples from each group/process were analyzed for total aerobic, anaerobic and thermophilic spores. The remaining sample per group/process was incubated for 37° C. for 7 days, then analyzed for commercial sterility. Conclusions:

The results (Table 7) demonstrate a challenge spore level of $\log_{10}$ 6.3–10.2 per package, below the targeted 13 log level.

was a raw uninoculated sample that was instantaneously pressurized at a pre-pressurized temperature of 85° C. C5 (sample 0-0-RI) was a raw inoculated sample not subjected to pressurization.

C1, C3 and C5 demonstrated the level of spores that result without the UHP treatment. C2 and C4 demonstrated that the instantaneous application of the ultra-high pressure is insufficient to inactivate the amount of spores to achieve sterility.

The several of the evaluated test conditions provided up to a 10+ log reduction (test sensitivity) in spore population. Commercial sterility was obtained by processing the samples at 90 Kpsi for 30 minutes at 85° C., or ≧5 minutes

TABLE 7

Pascalization Results from Example 4 (SETS A through F)

| Set | Sample Description | $\log_{10}$ B. subtilis per package | $\log_{10}$ B. stearothermphilus per package | $\log_{10}$ C. sporogenes per package | Commercial Sterility Test |
|---|---|---|---|---|---|
| | | Presterilized Inoculated samples | | | |
| C1 | 0-0-13-SI | 10.2 | 6.3 | 10 | Non-sterile |
| C2 | 0-85-SI | 10.5 | 6.2 | 9.6 | Non-sterile |
| A | 1-85-SI | 6.1 | 5.7 | 4.6 | Non-sterile |
| B | 5-85-SI | 1.7 | 2.1 | <1.0 | Non-sterile |
| C | 30-85-SI | <1.0 | <1.0 | <1.0 | Sterile |
| D | 1-98-SI | 1.5 | 3.5 | 2.7 | Non-sterile |
| E | 5-98-SI | <1.0 | <1.0 | <1.0 | Sterile |
| F | 30-98-SI | <1.0 | <1.0 | <1.0 | Sterile |
| | | Raw Uninoculated Samples | | | |
| C3 | 0-0-RU | 6 | 3.1 | 5.8 | Non-sterile |
| C4 | 0-85-RU | 4.8 | 2.9 | 4.3 | Non-sterile |
| C | 30-85-RU | <1.0 | <1.0 | <1.0 | Sterile |
| D | 1-98-RU | <1.0 | <1.0 | <1.0 | Sterile |
| E | 5-98-RU | <1.0 | <1.0 | <1.0 | Sterile |
| F | 30-98-RU | <1.0 | <1.0 | <1.0 | Sterile |
| | | Raw Inoculated Samples | | | |
| C5 | 0-0-RI | 9.7 | 5.4 | 10.7 | Non-sterile |
| A | 1-85-RI | 5.3 | 3.3 | 3.7 | Non-sterile |
| B | 5-85-RI | 1.3 | 1.6 | <1.0 | Non-sterile |
| C | 30-85-RI | <1.0 | <1.0 | <1.0 | Sterile |
| D | 1-98-RI | 1.5 | 3.5 | 2.7 | Non-sterile |
| E | 5-98-RI | <1.0 | <1.0 | <1.0 | Sterile |
| F | 30-98-RI | <1.0 | <1.0 | <1.0 | Sterile |

C1 (sample 0-0-13-SI) designates a sample with a target 13 log inoculation of a pre-sterilized product that was not subjected to pressure (zero pressure for zero time). C2 (sample 0-85-SI) was the same as C1 except the sample was exposed to an ultra-high pressure for zero minutes, that is, instantaneously pressurized and then released. C3 (sample 0-0-RU) was a raw (unsterilized) uninoculated sample that was not subjected to pressurization. C4 (sample 0-85-RU)

at 98° C. These results were validated in the outgrowth study which demonstrated no surviving spores from this treatment.

Example 5

Calibrated spore suspensions were prepared containing from $10^7$ to $10^{13}$ spores per milliliter. A 1 milliliter volume from one of the calibrated suspensions was individually added to 10 milliliters of phenol red broth with 1% added dextrose and heat sealed. This was repeated until 3 test packs were prepared for each spore concentration/challenge organism (*Clostridium sporogenes, Bacillus subtilis*, or *Bacillus stearothermophilis*). All pouches were stored on ice until evaluated.

Two pouches per challenge organism/spore concentration were preconditioned to temperatures up to 98° C. then exposed to 90 Kpsi for up to 30 minutes. A total of 5 trials were performed. After processing, the samples were placed on ice until evaluated for surviving spores. The *B. subtilis* pouches were incubated aerobically at 35° C. for 7 days. The pouches containing *C. sporogenes* were incubated anaerobically at 35° C. for 7 days. The *B. stearothermophilus* pouches were incubated at 55° C. for 7 days. All pouches were observed for signs of bacterial growth as evidenced by a yellow broth color (due to acid production).

Conclusions:

The results from Example 5 were partly inconclusive since the test pouches served to insulate the spores from the desired exposure temperatures. Several pouches were tested simultaneously which resulted in the pouches being in contact with one another. The pouches surrounded by other pouches were insulated and therefore did not achieve the pre-pressurized temperatures. Additionally, the thermocouples were malfunctioning throughout the test so temperature profiles were not accurately determined.

Spore reductions between 6–11 logs were observed depending on the process conditions/spore type evaluated. The greatest level of inactivation was observed using a 98° C. preconditioning temperature and a 30 minute exposure at 90 Kpsi. This resulted in actual spore reductions between 9 logs (*B. subtilis*) and 11 logs (*B. stearothermophilus*).

As illustrated by the foregoing description and examples, the present invention has great application for the sterilization of a wide variety of food products. The present invention provides an efficient method of sterilizing low acid foods by reducing the sterilization times required to achieve peak temperature. The present invention also allows for the avoidance of thermal degradation that occurs in conventionally sterilized products due to the shorter duration of thermal exposure at the high temperature ranges.

The terms and expressions which have been employed are used as terms of description and not of limitation, and there is no intention in the use of such terms or expressions of excluding any equivalents of the features shown and described as portions thereof, it being recognized that various modifications are possible within the scope of the invention.

We claim:

1. A non-dairy food product having a pH equal to or greater than 4.6 prepared by a method of sterilizing the food product comprising the steps of:

a) heating a non-dairy food product having a pH equal to or greater than 4.6 to a temperature of greater than about 75° C. and less than 105° C. prior to sterilization;

b) placing the non-dairy food product in a pressure chamber;

c) subjecting the non-dairy food product to an ultra-high pressure of generally between 50,000 psi and 250,000 psi for a period of time wherein the elevated temperature and ultra-high pressure provide for an instantaneous adiabatic temperature increase through out the entire non-dairy food product, the adiabatic temperature increase resulting in a 10+ log spore kill to achieve commercial sterility;

d) releasing the pressure in order to return the non-dairy food product to its pre-pressurized temperature; and e) cooling the non-dairy food product to a desired end temperature.

2. The non-dairy food product of claim 1, wherein the food product is subject to an ultra-high pressure of between 75,000–150,000 psi.

3. The non-dairy food product of claim 2, wherein the food product is subject to an ultra-high pressure of between 100,000 psi and 125,000 psi.

4. The non-dairy food product of claim 1, wherein the food product is heated to generally between 80°–95° C.

5. The non-dairy food product of claim 1, wherein the step of instantaneous adiabatic temperature increase results in a peak temperature range of generally between 100°–160° C.

6. The non-dairy food product of claim 5, wherein the step of instantaneous adiabatic temperature increase results in a peak temperature range of generally between 120°–140° C.

7. The non-dairy food product of claim 1, wherein the step of providing the elevated temperature and ultra-high pressure result in an instantaneous adiabatic temperature increase through out the entire non-dairy food product, the adiabatic temperature increase resulting in a 10+ log spore kill to achieve commercial sterility is equal to or greater than 5 minutes.

8. The non-dairy food product of claim 1, wherein the food product is selected from a group consisting of pet foods, main meals, sauces, soups, stews, vegetables, beverages, and juices.

9. The non-dairy food product of claim 1, further including the step of packaging the food product prior to the sterilization process.

10. The non-dairy food product of claim 9, wherein the packaged food product is hermetically sealed.

11. The non-dairy food product of claim 1, wherein a predetermined $F_0$ lethality level throughout the entire non-dairy food product is achieved without over treating or overexposing portions of the non-dairy food product to thermal treatment.

* * * * *